(12) United States Patent
Hayzen et al.

(10) Patent No.: US 11,598,753 B2
(45) Date of Patent: Mar. 7, 2023

(54) REMOVAL OF EFFECTS OF ASYMPTOTICALLY DECAYING DC BIAS FROM VIBRATION WAVEFORM

(71) Applicant: Computational Systems, Inc., Knoxville, TN (US)

(72) Inventors: Anthony J. Hayzen, Knoxville, TN (US); Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 57 days.

(21) Appl. No.: 17/338,249

(22) Filed: Jun. 3, 2021

(65) Prior Publication Data

US 2021/0302393 A1 Sep. 30, 2021

Related U.S. Application Data

(63) Continuation-in-part of application No. 16/524,361, filed on Jul. 29, 2019, now abandoned.

(60) Provisional application No. 63/067,445, filed on Aug. 19, 2020.

(51) Int. Cl.
*G06F 11/30* (2006.01)
*G01N 29/44* (2006.01)
*G01N 29/46* (2006.01)
*G01N 29/14* (2006.01)

(52) U.S. Cl.
CPC ......... *G01N 29/4463* (2013.01); *G01N 29/14* (2013.01); *G01N 29/46* (2013.01)

(58) Field of Classification Search
CPC .................................................. G01N 29/4463
See application file for complete search history.

(56) References Cited

U.S. PATENT DOCUMENTS

2008/0033695 A1* 2/2008 Sahara ................... G01H 1/003
 702/185
2018/0217109 A1* 8/2018 Bowers, III ....... G01N 29/4427

* cited by examiner

*Primary Examiner* — Phuong Huynh
(74) *Attorney, Agent, or Firm* — Luedeka Neely Group PC

(57) ABSTRACT

A computer implemented method processes time waveform machine vibration data that are indicative of operational characteristics of a machine. The data, which were measured on the machine over a period of time having a begin time and an end time, are accessed from a memory or storage device. An integer number M of waveform samples are determined from the data to be averaged, and an asymptotically decaying DC bias component in the data is derived using a moving average of the M number of waveform samples. The DC bias component is extrapolated from the begin time of the waveform back to an earlier time and from the end time of the waveform forward to a later time. The DC bias component is then subtracted from the time waveform data, and a Fast Fourier Transform is performed on the data to generate a spectrum.

18 Claims, 15 Drawing Sheets

REMOVAL OF EFFECTS OF ASYMPTOTICALLY DECAYING DC BIAS FROM VIBRATION WAVEFORM

RELATED APPLICATIONS

This application claims priority as a continuation-in-part of co-pending U.S. nonprovisional patent application Ser. No. 16/524,361 filed Jul. 29, 2019, titled "Vibration Waveform DC Disturbance Removal," and claims priority to U.S. provisional patent application Ser. No. 63/067,445 filed Aug. 19, 2020, titled "Removal of Effects of Slowly Varying DC Bias from Vibration Waveform," the entire contents of which are incorporated herein by reference.

FIELD

This invention relates to the field of equipment vibration monitoring and analysis. More particularly, this invention relates to removing the effects of an asymptotically decaying DC bias from vibration waveform data.

INTRODUCTION

Vibration waveforms have what could be classified as two components. The first component is often referred to as the direct current or DC component, which often reflects the electrical bias of the output amplifier that is boosting the vibration signal. The second component is often referred to as the alternating current or AC component, which reflects the vibration signal that is produced by the accelerometer or other vibration sensing device. The AC component tends to oscillate around the level of the DC component, whatever that level might be. In many applications, the DC component is of lesser interest when analyzing the vibration of monitored equipment, while the AC component is of primary interest.

Unfortunately, if the DC component changes, it is difficult to determine what exactly has changed. For example, if the DC component suddenly increases, it is difficult to know if the increase is a result of the electrical amplifier bias or a major change in the condition of the AC vibration component. This problem is especially pronounced if the DC component is changing frequently and erratically.

Such a dramatic shift in the DC component can occur during one or more of several common events. For example, the mere placement of a vibration sensor against the equipment to be monitored can cause such a shift. Similarly, a hard, physical jolt to the monitored equipment can also produce such a shift. In a different manner, starting or stopping electrical equipment that is not adequately isolated from the vibration sensor can create such a shift. Thus, these troublesome shifts in the waveform data can be created by many different events and at various times.

When a Fast Fourier Transform is performed on the disturbed waveform, the resulting frequency spectrum can contain a significant amount of spurious low frequency components as a result of the DC disturbance. These spurious signals can be misinterpreted by the technician as problems with the monitored equipment.

Further, an effect sometimes referred to by machine vibration analysts as the "Ski Slope" in a vibration spectrum is caused by an asymptotically decaying DC electrical bias introduced by settling of the electronic circuitry component of an accelerometer sensor, such as by the accelerometer sensor's output amplifier. This DC bias settling causes the vibration waveform to have a slowly decaying DC offset component that asymptotically approaches an equilibrium value referred to as the DC bias voltage. This effect is also referred to herein as the asymptotically decaying DC bias.

When a Fast Fourier Transform (FFT) is performed on the waveform, the resulting frequency spectrum contains a significant number of low frequency components related to the asymptotically decaying DC bias component of the waveform. This is typically compensated for by ignoring the DC and very low frequency components of the spectrum. However, there are many situations in which simply ignoring these spectral components is not adequate. Also, it is often difficult to know the exact spectral frequency below which the DC and very low frequency components should be ignored.

What is needed, therefor, is a system that addresses issues such as those described above, at least in part.

SUMMARY

The above and other needs are met by a method for removing DC disturbance in a vibration waveform, by receiving the vibration waveform and detecting and removing a DC disturbance component of the vibration waveform, leaving substantially only an AC component of the vibration waveform, which is stored on a non-transitory computer-readable medium.

In various embodiments according to this aspect of the invention, the step of detecting the DC disturbance component comprises computing a running average of the vibration waveform and using the running average as the DC component. In some embodiments, the step of removing the DC component includes subtracting the running average of the vibration waveform from the vibration waveform. In some embodiments, the step of receiving the vibration waveform includes receiving the vibration waveform directly from a vibration sensor. In some embodiments, the step of receiving the vibration waveform includes receiving the vibration waveform as stored data from a memory.

In some embodiments, the step of storing the AC component includes storing the AC component in a memory that located locally where the detecting and removing of the DC component is performed. In some embodiments, the step of storing the AC component includes storing the AC component in a memory that is located remotely from where the detecting and removing of the DC component is performed. In some embodiments, an FFT is performed on the AC component to produce a vibration spectrum.

According to another aspect of the invention there is described a non-transitory, computer-readable storage medium having stored thereon a computer program with a set of instructions for causing a computer to remove the DC disturbance component in a vibration waveform. The vibration waveform is received, and a DC component is detected and removed, leaving substantially only an AC component. The AC component is then stored on a non-transitory computer-readable medium.

In various embodiments according to this aspect of the invention, the step of detecting the DC component includes computing a running average of the vibration waveform and using the running average as the DC component. In some embodiments, the step of removing the DC component includes subtracting the running average of the vibration waveform from the vibration waveform. In some embodiments, the step of receiving the vibration waveform includes receiving the vibration waveform directly from a vibration sensor. In some embodiments, the step of receiving the vibration waveform includes receiving the vibration waveform as stored data from a memory.

In some embodiments, the step of storing the AC component includes storing the AC component in a memory that is located locally to where the detecting and removing of the DC component is performed. In some embodiments, the step of storing the AC component includes storing the AC component in a memory that is located remotely from where the detecting and removing of the DC component is performed. In some embodiments, an FFT is performed on the AC component to produce a vibration spectrum.

According to yet another aspect of the invention, there is described an apparatus for removal of the DC disturbance component in a vibration waveform. The apparatus has an input to receive the vibration waveform, and a processor that detects and removes the DC disturbance component, leaving substantially only an AC component remaining. A non-transitory storage medium stores the AC component.

In various embodiments according to this aspect of the invention, the input includes a vibration sensor that produces a live vibration waveform. In some embodiments, the input includes a memory that provides a stored vibration waveform. In some embodiments, an interface is adapted to receive instructions from and present information to an operator.

In another aspect, there is described herein a method for removing an asymptotically decaying DC bias component of a vibration waveform, thereby effectively eliminating the low frequency components of the spectrum caused by the settling of the DC component of the waveform. The method can be applied as a post process in a software application or in the firmware of a vibration monitoring device as the waveform is being acquired. The method described can be applied to any type of vibration waveform that exhibits the behavior described above.

A preferred embodiment of the method for removing the asymptotically decaying DC bias component includes:
  (a) accessing the time waveform machine vibration data from a memory or storage device, wherein the time waveform machine vibration data were measured on the machine over a period of time having a begin time and an end time;
  (b) determining an integer number M of waveform samples from the time waveform machine vibration data to be averaged;
  (c) deriving an asymptotically decaying DC bias component in the time waveform machine vibration data using a moving average of the M number of waveform samples;
  (d) extrapolating the asymptotically decaying DC bias component from the begin time of the waveform back to an earlier time and from the end time of the waveform forward to a later time;
  (e) subtracting the asymptotically decaying DC bias component from the time waveform machine vibration data; and
  (f) performing a Fast Fourier Transform on the time waveform machine vibration data to generate a spectrum.

In some embodiments, step (b) comprises determining the integer number M of waveform samples to be averaged based at least in part on a turning speed of a component of the machine.

In some embodiments, the integer number M of waveform samples includes samples collected over at least two full rotations of the component of the machine.

In some embodiments, step (c) comprises deriving the asymptotically decaying DC bias component using a moving average beginning at least M/2 number of data values prior to the begin time and ending at least M/2 number of data values after the end time.

In some embodiments, step (d) comprises extrapolating the asymptotically decaying DC bias component using a linear least square fit algorithm.

In some embodiments, step (d) comprises extrapolating the asymptotically decaying DC bias component using 2M number of data values prior to the begin time of the derived asymptotically decaying DC bias component and using 2M number of data values after the end time of the derived asymptotically decaying DC bias component.

Another embodiment of a method for removing the asymptotically decaying DC bias component includes:
  (a) accessing the time waveform machine vibration data from a memory or storage device, wherein the time waveform machine vibration data were measured on the machine over a period of time having a begin time and an end time;
  (b) fitting a polynomial or exponential equation to the time waveform machine vibration data;
  (c) calculating an asymptotically decaying DC bias component in the time waveform machine vibration data using the polynomial or exponential equation fitted in step (b);
  (d) subtracting the asymptotically decaying DC bias component from the time waveform machine vibration data; and
  (e) performing a Fast Fourier Transform on the time waveform machine vibration data to generate a spectrum.

In some embodiments, step (b) comprises fitting a quadratic equation to the time waveform machine vibration data.

In another aspect, preferred embodiments are directed to a computer implemented process for operating on time waveform machine vibration data that are indicative of operational characteristics of a machine. The steps of this embodiment include:
  accessing the time waveform machine vibration data from a memory or storage device, wherein the time waveform machine vibration data were measured on a machine over a period of time having a begin time and an end time;
  selecting either a first method or a second method for determining an asymptotically decaying DC bias component in the time waveform vibration data, wherein the first method comprises:
    (a) determining an integer number M of waveform samples to be averaged;
    (b) deriving the asymptotically decaying DC bias component in the time waveform machine vibration data using a moving average of the M number of waveform samples; and
    (c) extrapolating the asymptotically decaying DC bias component from the begin time of the waveform back to an earlier time and from the end time of the waveform forward to a later time,
  and wherein the second method comprises:
    (d) fitting a polynomial or exponential equation to the time waveform machine vibration data; and
    (e) calculating the asymptotically decaying DC bias component using the polynomial or exponential equation fitted in step (d), performing either the first method or the second method to determine the asymptotically decaying DC bias component;

subtracting the asymptotically decaying DC bias component from the time waveform machine vibration data; and performing a Fast Fourier Transform on the time waveform machine vibration data to generate a spectrum.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

Figure 13:
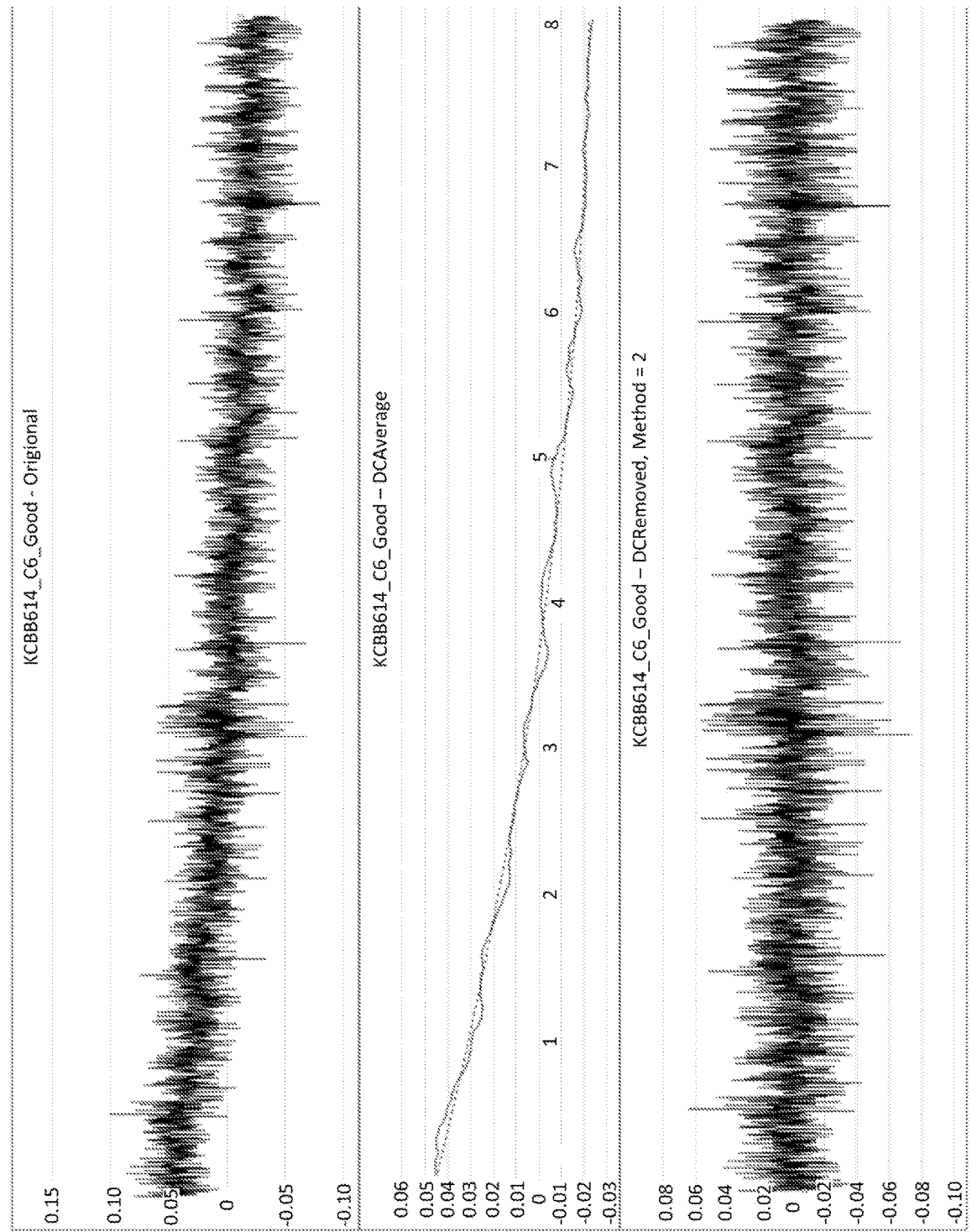
FIG. 13 depicts a typical vibration waveform that contains an asymptotically decaying DC bias component.
Figure 14:
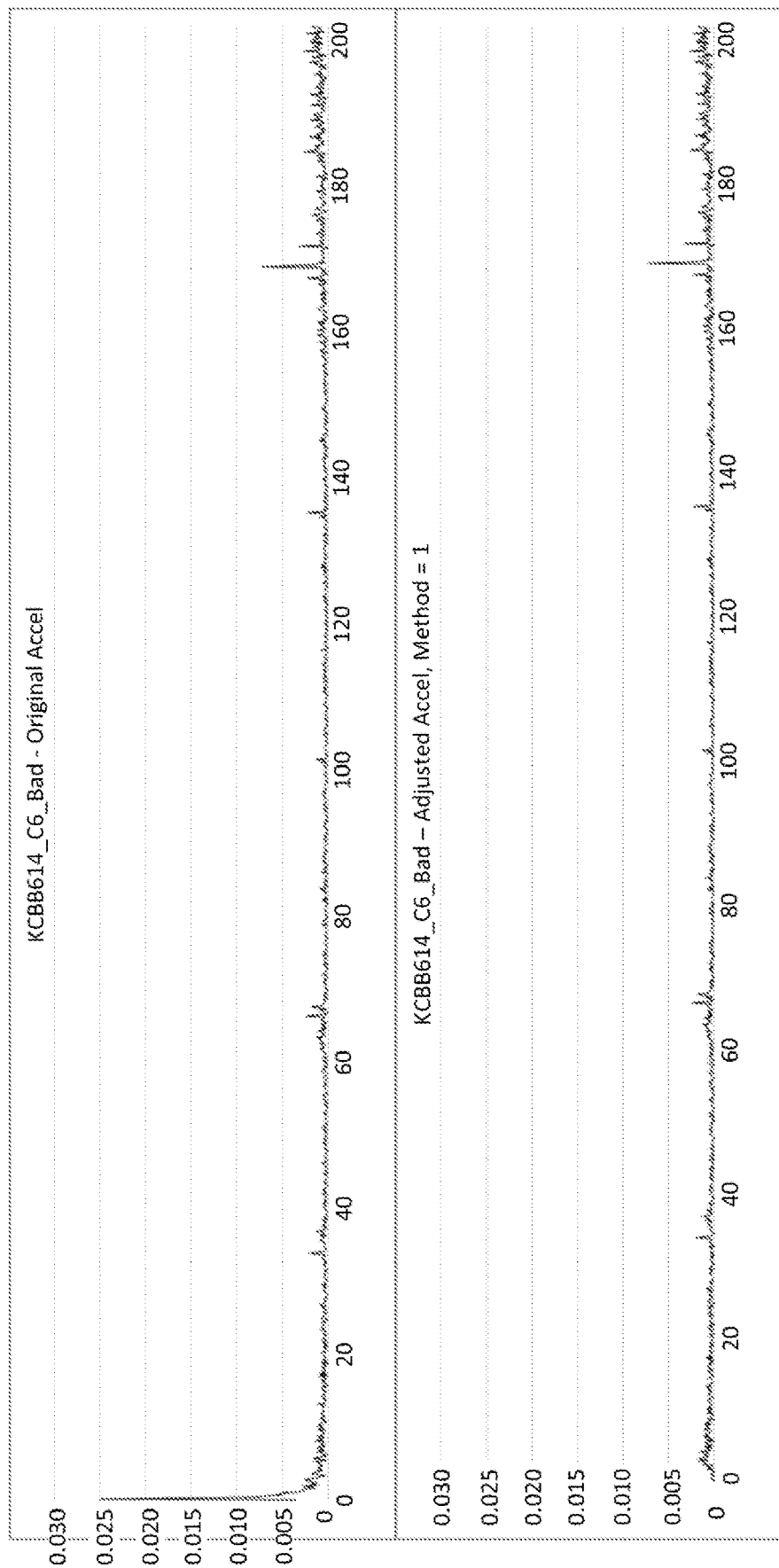
Figure 15:
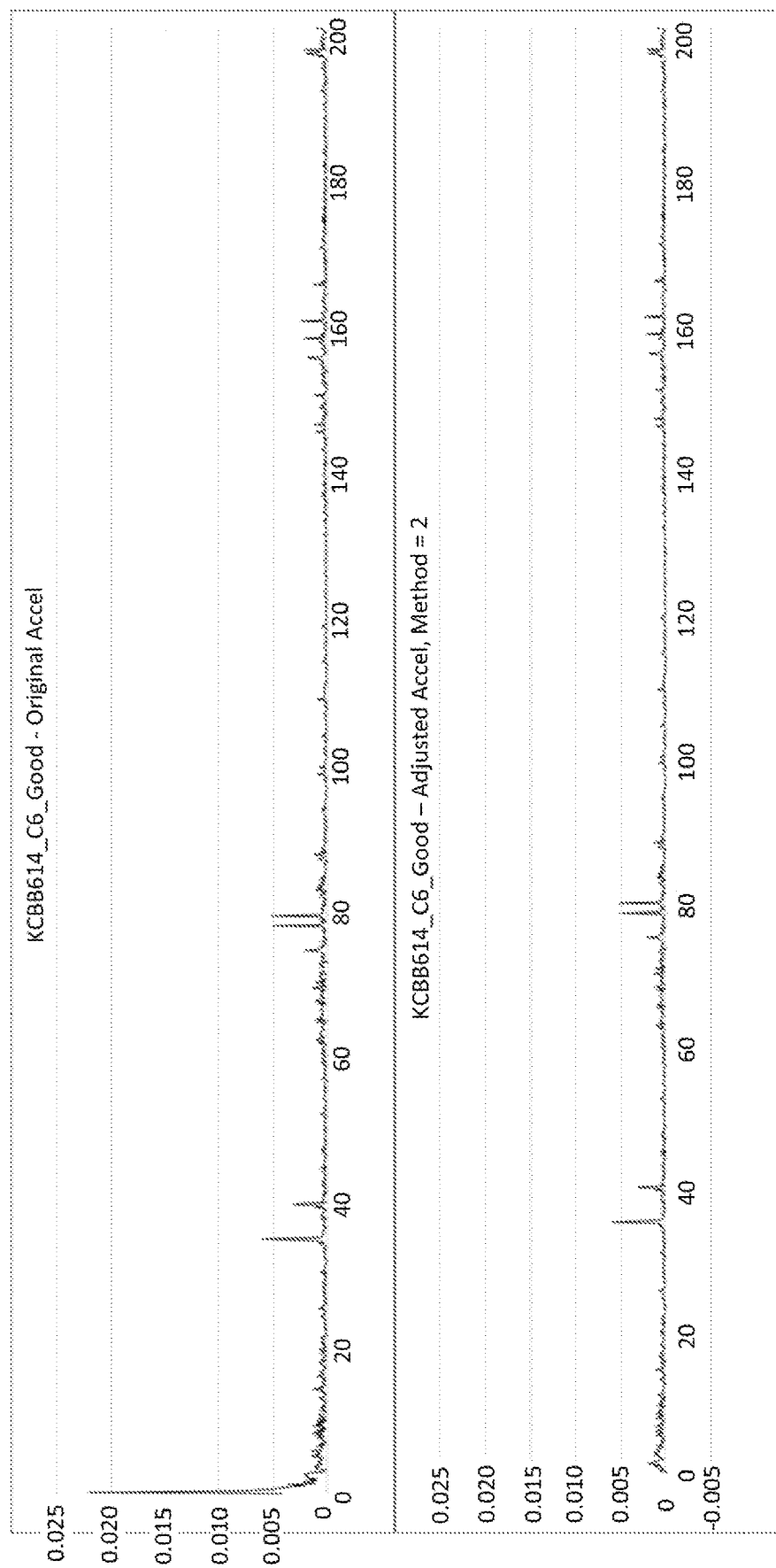

FIG. 14 depicts a vibration spectrum derived from the vibration waveform of FIG. 13 when the first method is used for removing the asymptotically decaying DC bias component of the vibration waveform data; and FIG. 15 depicts a vibration spectrum derived from the vibration waveform of FIG. 13 when the second method is used for removing the asymptotically decaying DC bias component of the vibration waveform data.

DESCRIPTION

Figure 1:
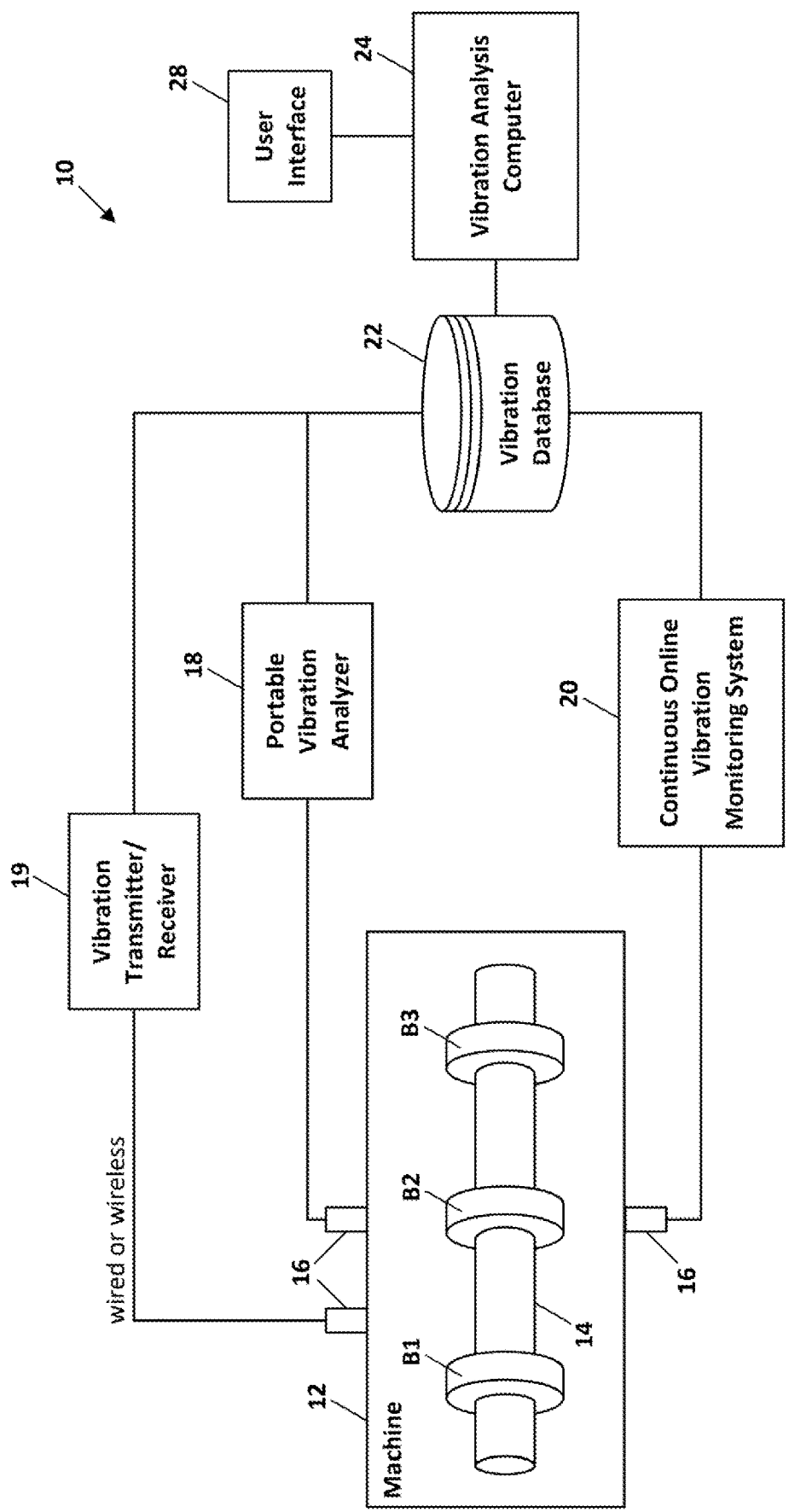
FIG. 1 depicts a vibration measurement and analysis system according to a preferred embodiment.

As depicted in FIG. 1, a vibration measurement and analysis system 10 includes vibration sensors 16 attached to a machine 12. The machine 12 includes at least one rotating component 14, such as a shaft supported by bearings B1, B2, and B3. The vibration sensors 16 may be placed on the machine 12 in vertical, horizontal and axial positions at each bearing location. The vibration sensors 16 generate vibration signals representative of the vibration of the machine 12, which include vibration components associated with the bearings B1, B2, and B3. The vibration signals are received, conditioned, and converted to time waveform digital data by one or more vibration data collectors, such as a portable vibration analyzer 18, a vibration transmitter/receiver 19 (wired or wireless), or a continuous online vibration monitoring system 20. The vibration data collectors 18, 19, and 20 include signal conditioning circuitry and analog-to-digital conversion circuitry for conditioning the vibration signals from the sensors 16 and generating the time waveform digital vibration data based thereon.

The vibration time waveform data are preferably stored in a vibration database 22 from which the data is available for analysis by software routines executed on a vibration analysis computer 24. Alternatively, the vibration time waveform data are stored in data storage devices in the portable vibration analyzer 18, vibration transmitter/receiver 19, or the continuous online vibration monitoring system 20. In preferred embodiments, the system 10 includes a user interface 28, such as a touch screen, that allows a user to view measurement results, select certain measurement parameters, and provide other input as described herein.

Removal of DC Disturbance Component

Figure 2:
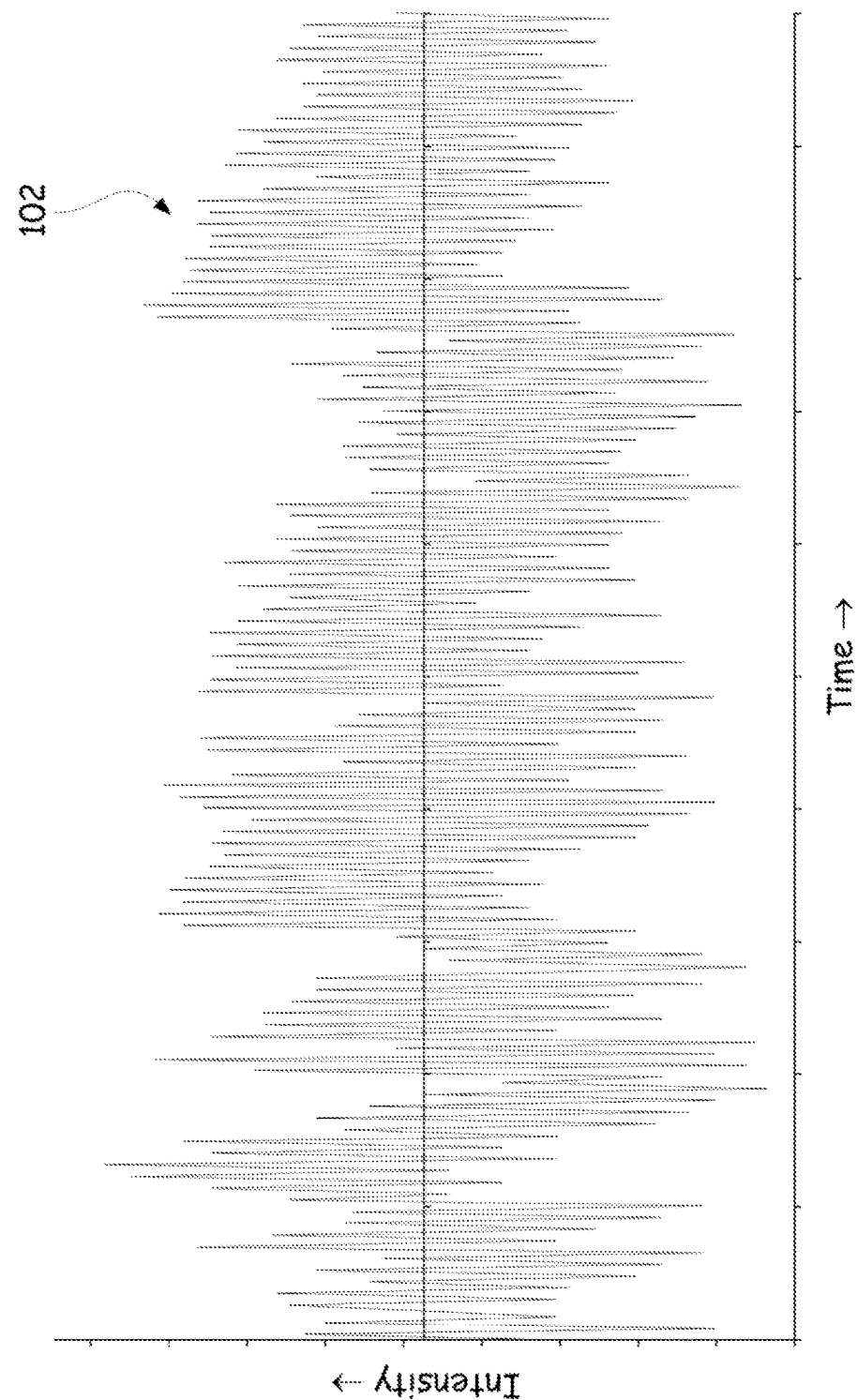
FIG. 2 is a plot of a waveform showing the effect of a DC disturbance component according to an embodiment of the present invention.
Figure 5:
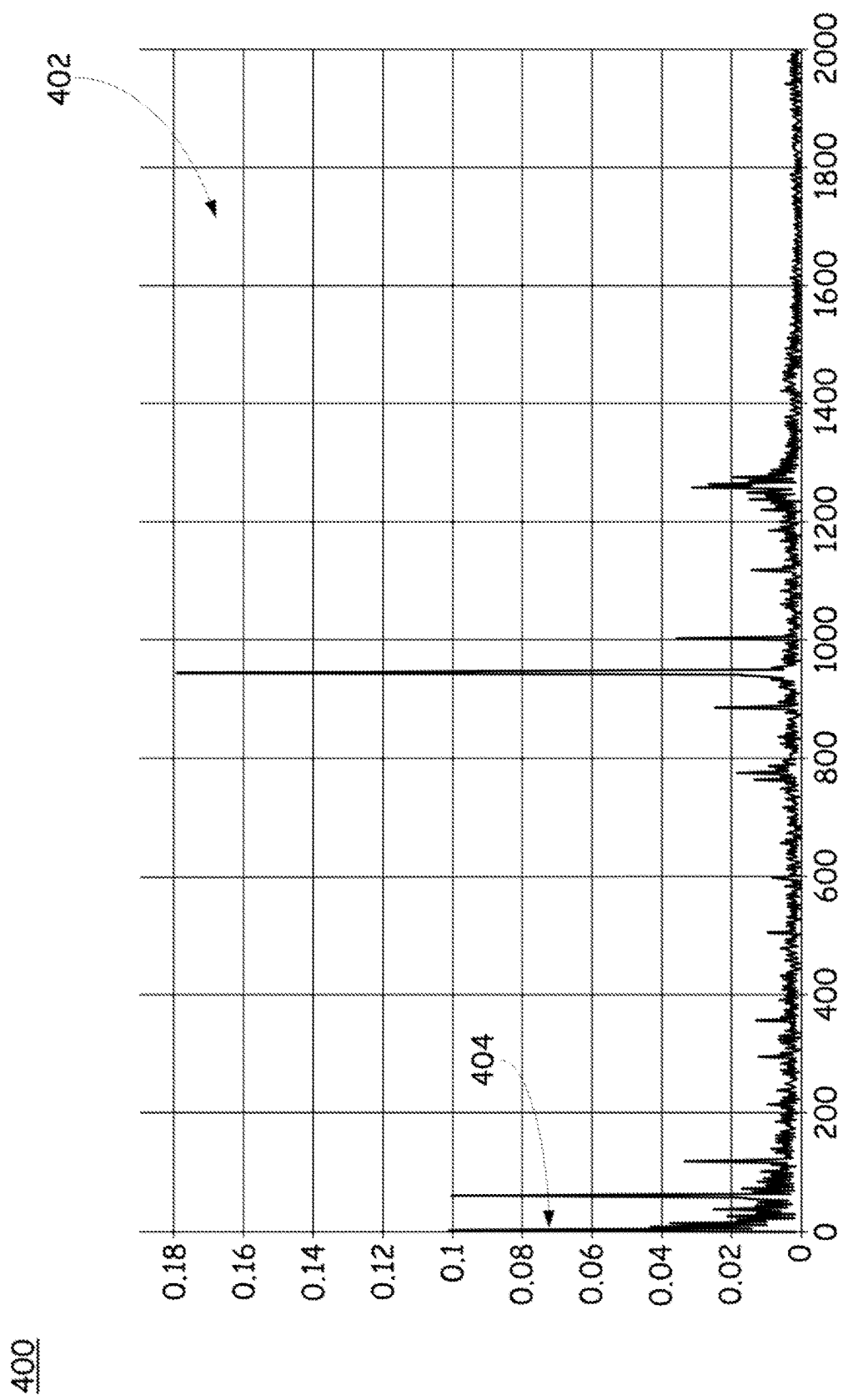
FIG. 5 is a plot of a spectrum generated from a waveform with a DC disturbance component according to an embodiment of the present invention.

With reference now to FIG. 2, there is depicted a plot 100 of a waveform 102. Based on casual observation of the waveform 102, it is difficult to discern if the waveform 102 represents the actual vibration profile of the monitored equipment, or if there are spurious signals in the DC component of the waveform 102. FIG. 5 depicts a representational plot 400 of a spectrum 402 that is created by performing an FFT on the waveform 102. As can be seen in FIG. 5, there are some relatively strong low-frequency peaks 404 present in the spectrum 402.

Figure 3:
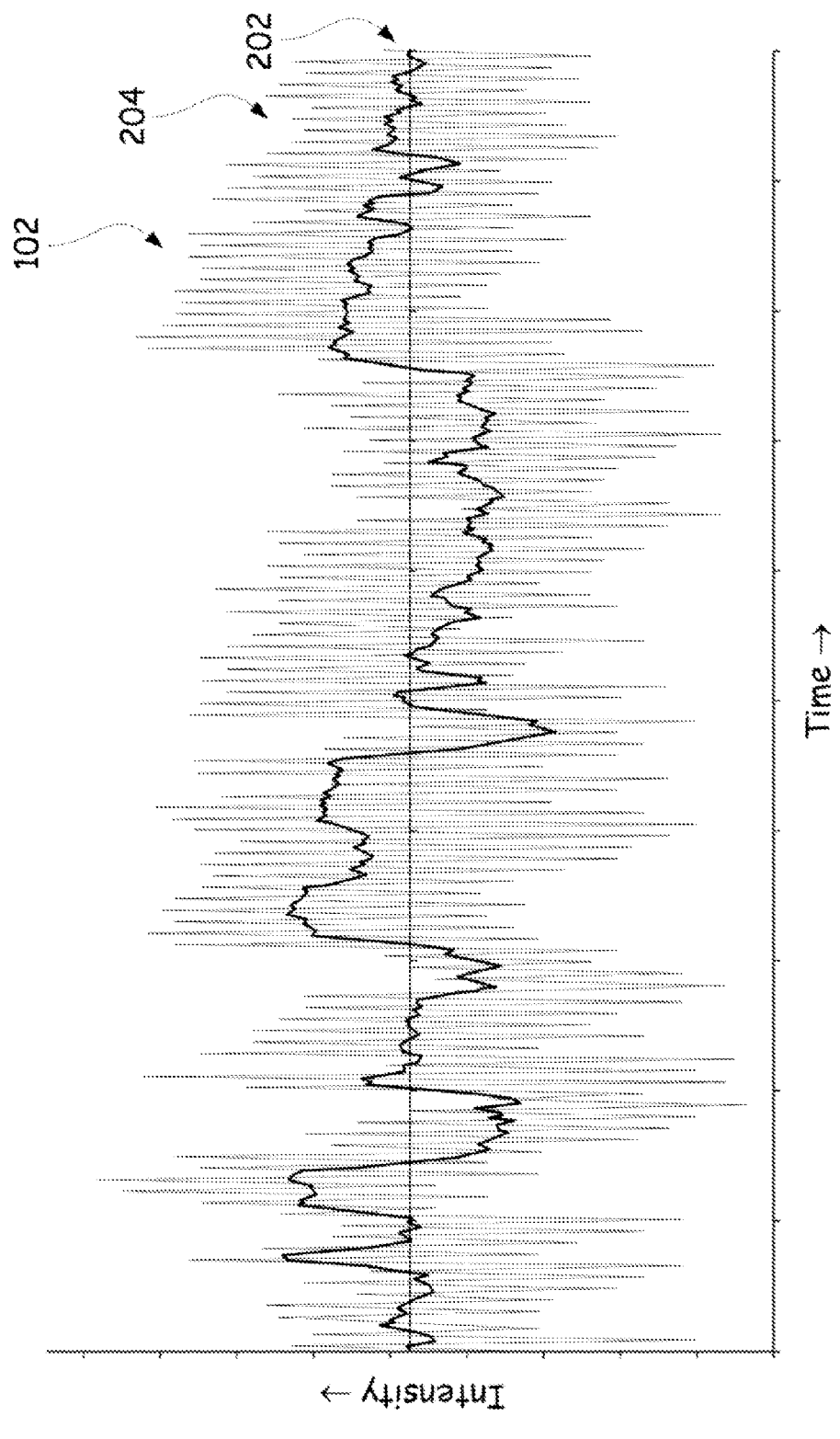
FIG. 3 is a plot of a waveform, where the shift in the DC disturbance component of the waveform has been identified according to an embodiment of the present invention.

With reference now to FIG. 3, there is depicted the waveform 102 in which the DC component 202 of the waveform 102 has been identified. A representational method for identifying the DC component 202 is presented hereafter, but it is appreciated that there are many methods by which the DC component 202 within a waveform 102 could be identified. As depicted, the DC component 202 of the waveform 102 is extremely unsteady and rises and falls to many different levels. This is not normal vibrational activity and represents an anomaly in the DC component 202 of the waveform 102 that is obfuscating the changes in the AC component 204 that represents the vibrational data of greater interest.

Figure 4:
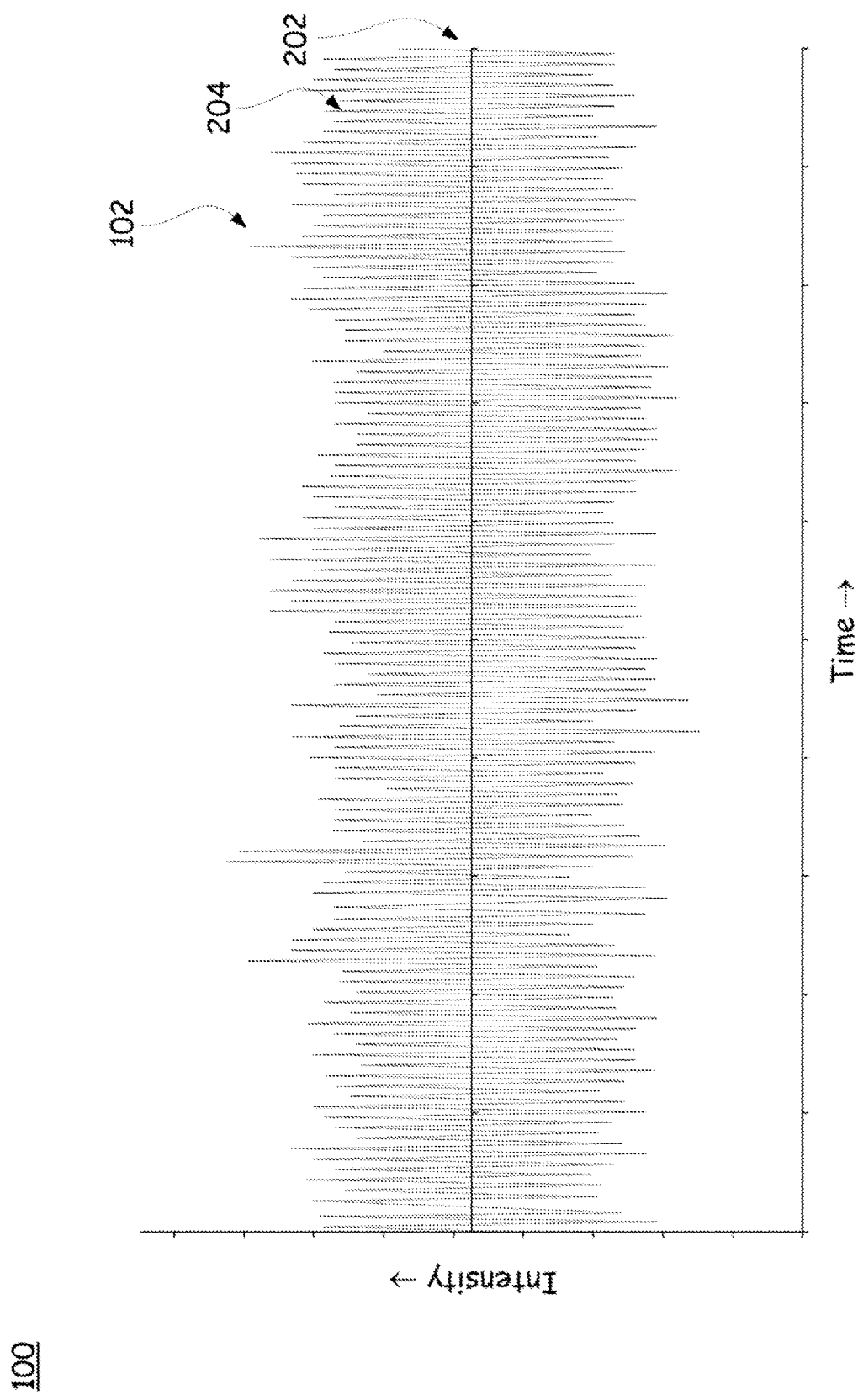
FIG. 4 is a plot of a waveform where the DC disturbance component of the waveform has been removed according to an embodiment of the present invention.

With reference now to FIG. 4, there is depicted the waveform 102 from which the DC disturbance component 202 of the waveform 102 has been removed or, in other words, brought to a substantially consistent level across either the entirety of or a desired portion of the duration of the waveform 102. In some embodiments, this produces a DC component 202 that is represented by a straight, flat line that is parallel to the x-axis (time axis) of the plot 100. In other embodiments, the DC component 202 is substantially removed within a given tolerance around a flat line. A representational method for removing the DC component 202 is presented hereinafter, but it is appreciated that there are many methods by which the DC component 202 within a waveform 102 could be removed.

Figure 6:
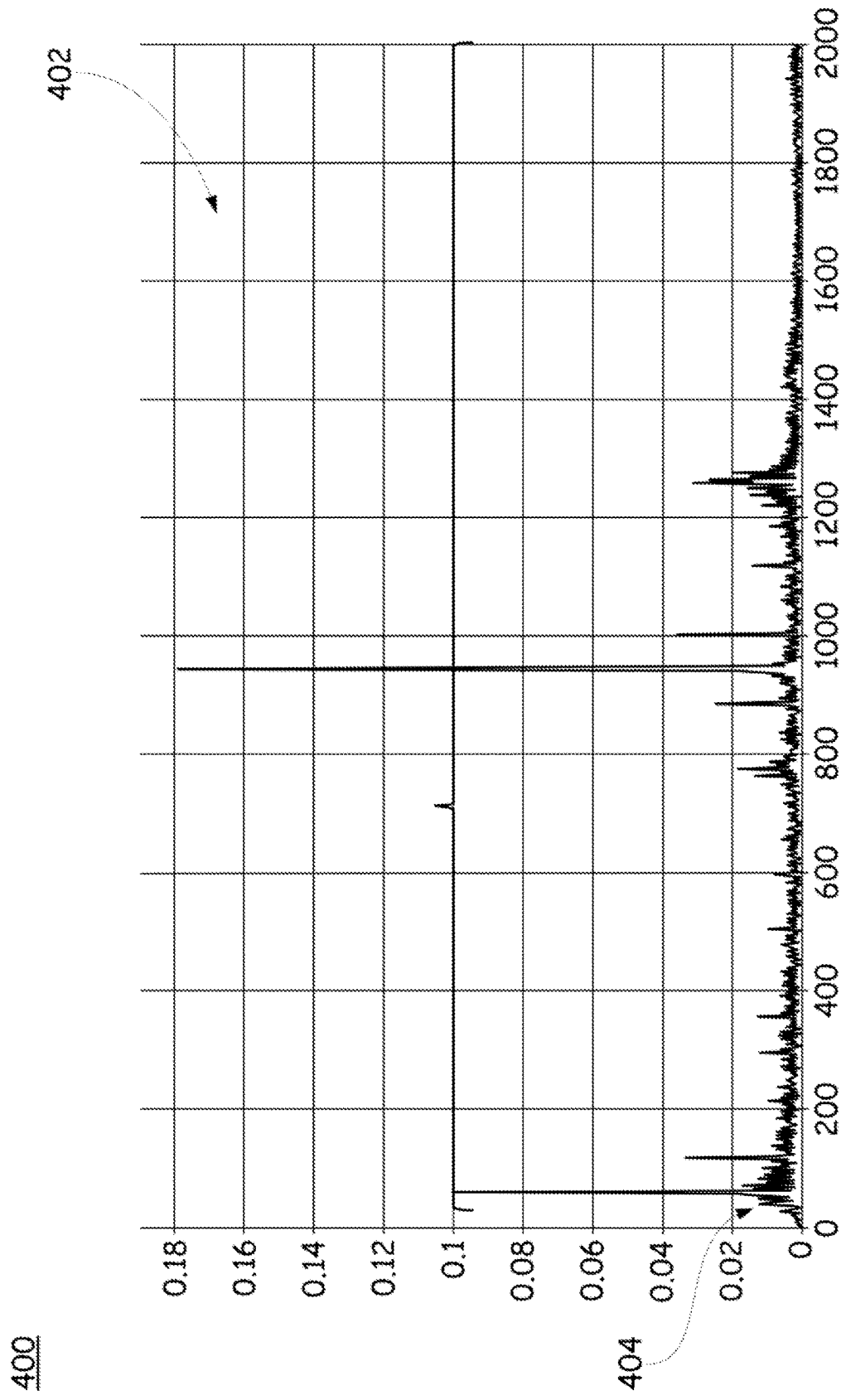
FIG. 6 is a plot of a spectrum generated from a waveform from which the DC disturbance component has been removed in the underlying waveform data according to an embodiment of the present invention.

With reference now to FIG. 6, there is depicted the plot 400 of the spectrum 402 of the waveform with the DC disturbance component removed as depicted in FIG. 4. As can be seen in FIG. 6, the low frequency peaks 404 of the waveform with the DC disturbance component removed have been attenuated to some extent and are not as strong as previously depicted in the spectrum where the DC disturbance has not been removed of FIG. 5. In this manner, the plot 400 of FIG. 6 represents what could be described as real or non-anomalous vibration information on the monitored equipment, on which a technician or engineer can base informed and accurate decisions.

Figure 7:
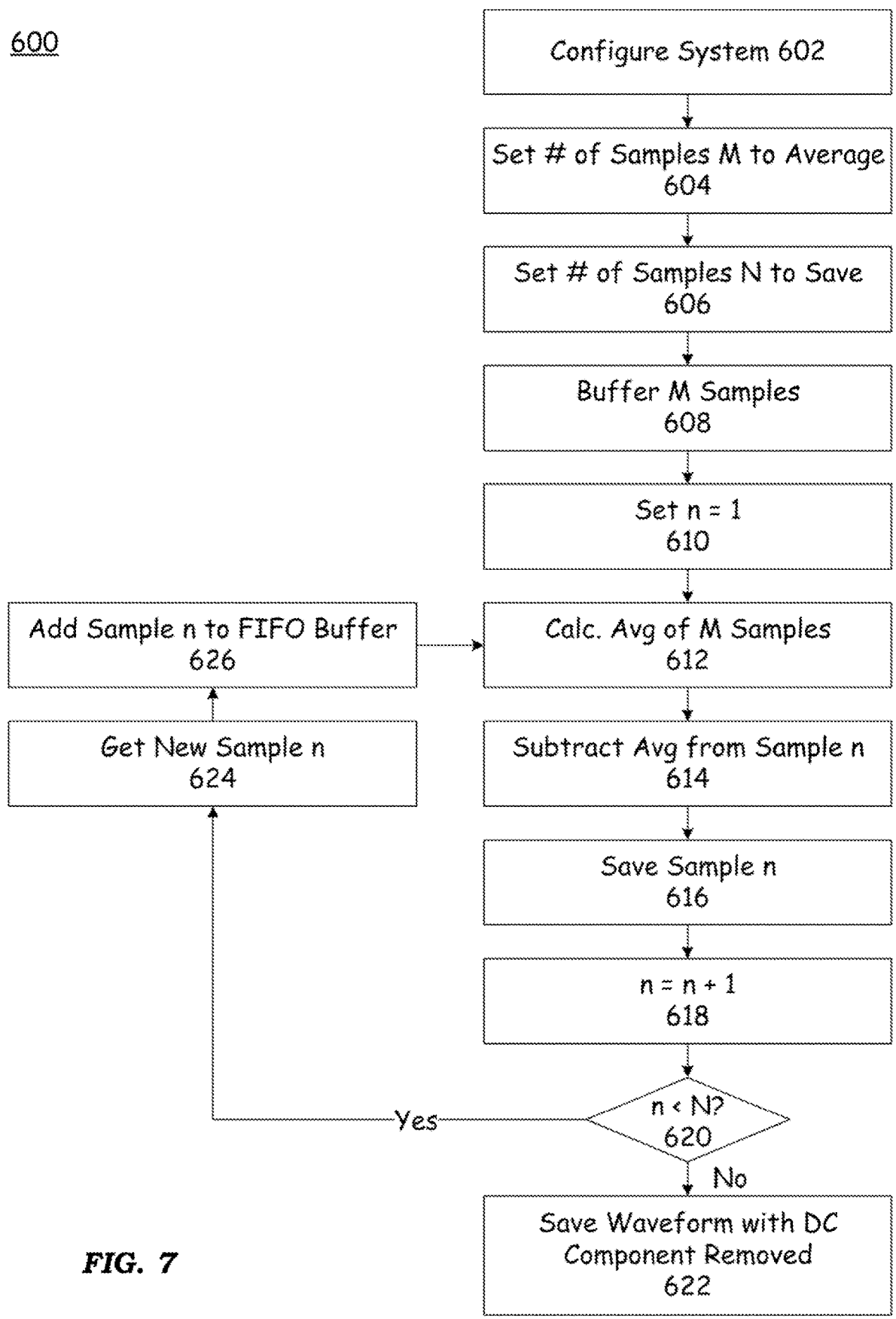
FIG. 7 depicts a flow chart of a method for removing the DC disturbance component from the underlying waveform according to an embodiment of the present invention.

FIG. 7 provides a flowchart of a method 600 by which the DC disturbance component of the waveform can be removed. Beginning at step 602 of the method 600, a vibration monitoring system is configured to collect a vibration waveform from the monitored equipment. The DC disturbance component 202 of the waveform 102 is removed by averaging a given number of data points in the waveform 102. Thus, the number M of waveform data points or samples to average is set (step 604), and the number of waveform samples N to save is set (step 606).

The method 600 can be performed either as pre-processing on a live waveform data stream as it is produced, or on waveform data that has been saved to a storage device. Regardless of the immediate source of the waveform data, M samples of waveform data are placed in a random access memory (step 608), and the sample number n is set to 1 (step 610). The average of M waveform samples is calculated (step 612), and the average so calculated is subtracted from sample n of the waveform data (step 614). The sample n is then saved (step 616) and the value of n is incremented by 1 (step 618).

If n is less than N, then the next waveform sample is read from the memory (step 624) and is added to the buffer for averaging (step 626), where only M samples are held in the buffer at a time, and the newly input sample pushes out an earlier-acquired sample according to a first-in-first-out methodology. The method 600 then cycles back to step 612, where a new average of the M samples is calculated. This process repeats until n is equal to N (step 620), at which point the DC component 202 is removed from the buffered waveform (step 622) and is either passed along for further processing or saved to a non-transitory computer-readable storage device.

Figure 8:
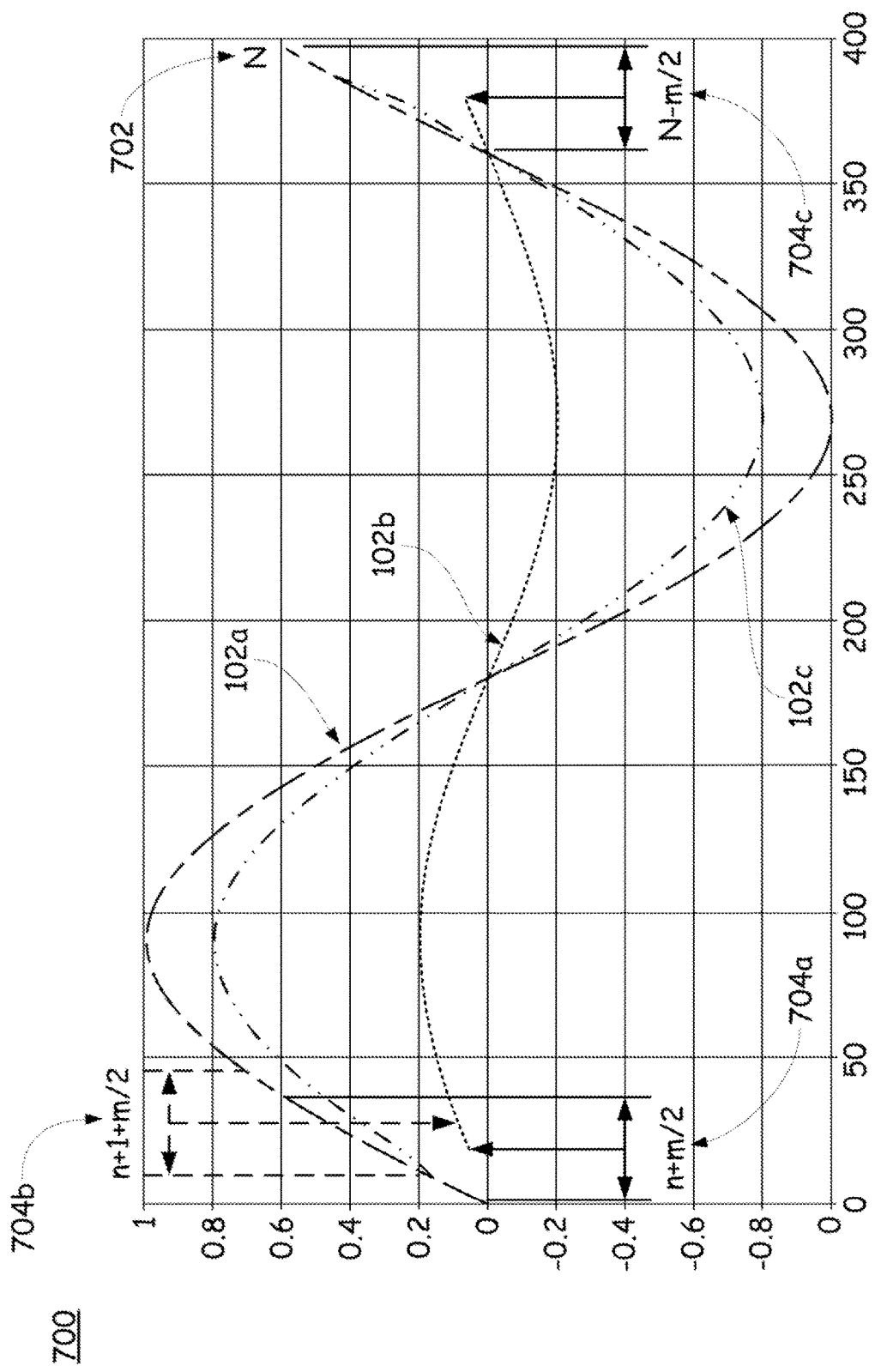
FIG. 8 depicts in graphical form how the DC disturbance component in the underlying waveform is removed according to an embodiment of the present invention.

With reference now to FIG. 8, there is depicted a plot 700 that provides a graphical explanation of the method 600. The waveform 102a represents the original waveform with the anomalous DC component 202. The waveform 102b represents the moving-average DC component of the original waveform, and the waveform 102c represents the vibration waveform from which the averaged DC component has been removed. The total number of points N in the waveform 102 is indicated at 702. The first averaged calculation is depicted at 704a, the second at 704b, and the final averaged calculation is depicted at 704c. Each of these produces a first, second, and final centered average as indicated. For example, the first centered average is at n+m/2 of n−m/2 to n+m/w of m+1 points, where m is the number of points to average, and so forth for all n in N.

In one embodiment, the number of waveform samples to average is set to an integral number of the equipment turning speed, and includes two full rotational cycles of the equipment. This helps to capture bearing faults that might appear at about one-half of the turning speed. The number of samples to average can be a user-configurable number, or can be set to a default value, depending on the type of faults the equipment may exhibit.

Removal of Asymptotically Decaying DC Bias Component

Also described herein are two methods for removing an asymptotically decaying DC bias component of vibration waveform data. In both method embodiments, a processor in the portable vibration analyzer 18, the vibration transmitter/receiver 19, the continuous online vibration monitoring system 20, or the vibration analysis computer 24 performs the steps in the methods.

Method 1

Figure 9:
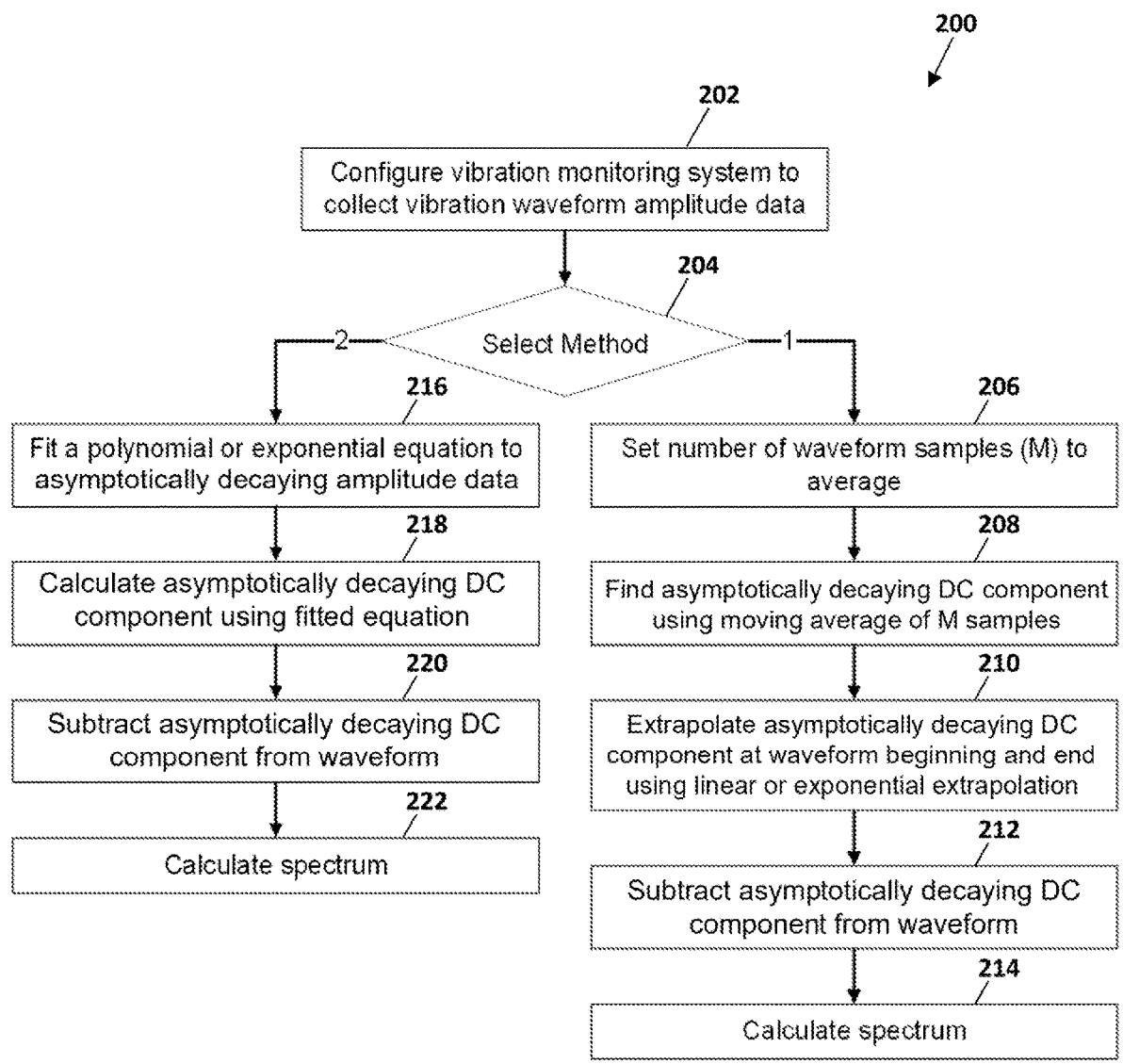
FIG. 9 depicts two embodiments of methods for removing an asymptotically decaying DC bias component of vibration waveform data.

With reference to FIG. 9, a process 200 is described hereinafter in which either of the two methods may be selected (step 204), either before or after configuring the vibration monitoring system 10 (FIG. 1) to collect vibration waveform amplitude data (step 202). The basic approach of the first method is to collect a vibration waveform and use a moving average across the waveform to subtract the moving average from the waveform. Although this is similar to the processes described previously, a difference is that the waveform is of a finite length and is specifically collected for spectral analysis. Therefore, the asymptotically decaying DC bias component is preferably extrapolated at the beginning and end of the waveform to remove the asymptotically decaying DC bias component from the entire waveform.

The method can be used either in real-time by embedding the process in the firmware of the portable vibration analyzer 18 or in the software of the continuous online vibration monitoring system 20 such that the asymptotically decaying DC bias component is removed as the waveform is being collected. Alternatively, the asymptotically decaying DC bias component may be removed in a post processing operation performed by the vibration analysis computer 24 after the waveform data have been stored in the database 22.

The number (M) of waveform samples to average should ideally be set to an integral number of the machine's turning speed, and should include at least two full cycles of the machine (step 206). Experimentation has indicated that the number of samples can be as low as half a revolution and the samples need not be collected over an exact number of revolutions. The difference is in the smoothing of the asymptotically decaying DC bias component. Best results are obtained with approximately two revolutions of data.

With continued reference to FIG. 9, once the asymptotically decaying DC bias component has been determined (step 208), the next step is to extrapolate the DC component at the beginning and end of the waveform (step 210). This is necessary as the averaging process starts and ends at M/2 number of data values from each end. The beginning and end DC components are preferably extrapolated using a linear least square fit algorithm to the DC component data using 2M number of data values at each end of the derived DC component data. Using the calculated linear equation, the first and last M/2 number of data values are calculated resulting in an asymptotically decaying DC bias component for the entire waveform.

In the preferred embodiment, an exponential extrapolation algorithm can be used to determine the endpoints.

The asymptotically decaying DC bias component is then subtracted from the waveform by subtracting each DC point value from each of the corresponding waveform point values (step 212). An FFT is performed on this modified waveform to derive a spectrum in which the low frequency components related to the asymptotically decaying DC bias component have been removed (step 214).

One advantage of this method is that it can also detect and be used to remove DC spikes as described elsewhere herein.

Method 2

The method of the second embodiment involves fitting a polynomial or exponential equation to the entire waveform amplitude data (step 216). The fitted equation is used to calculate the asymptotically decaying DC bias component (step 218) which is then subtracted from the original waveform (step 220). An FFT is performed on the modified waveform to derive a spectrum in which the low frequency components related to the asymptotically decaying DC bias have been removed (step 222).

Discussed hereinafter are examples of this method that fit a second order polynomial (quadratic) equation in step 216. This was found to be the simplest and most effective approach, although other types of equations may be more appropriate in other situations.

One advantage of the second method is that it is simpler than the first method, although it will not detect DC spikes. This method is better for removing the DC component associated with settling of the waveform signal.

Examples of Waveforms Resulting in Spectrum Ski Slopes

Figure 10:
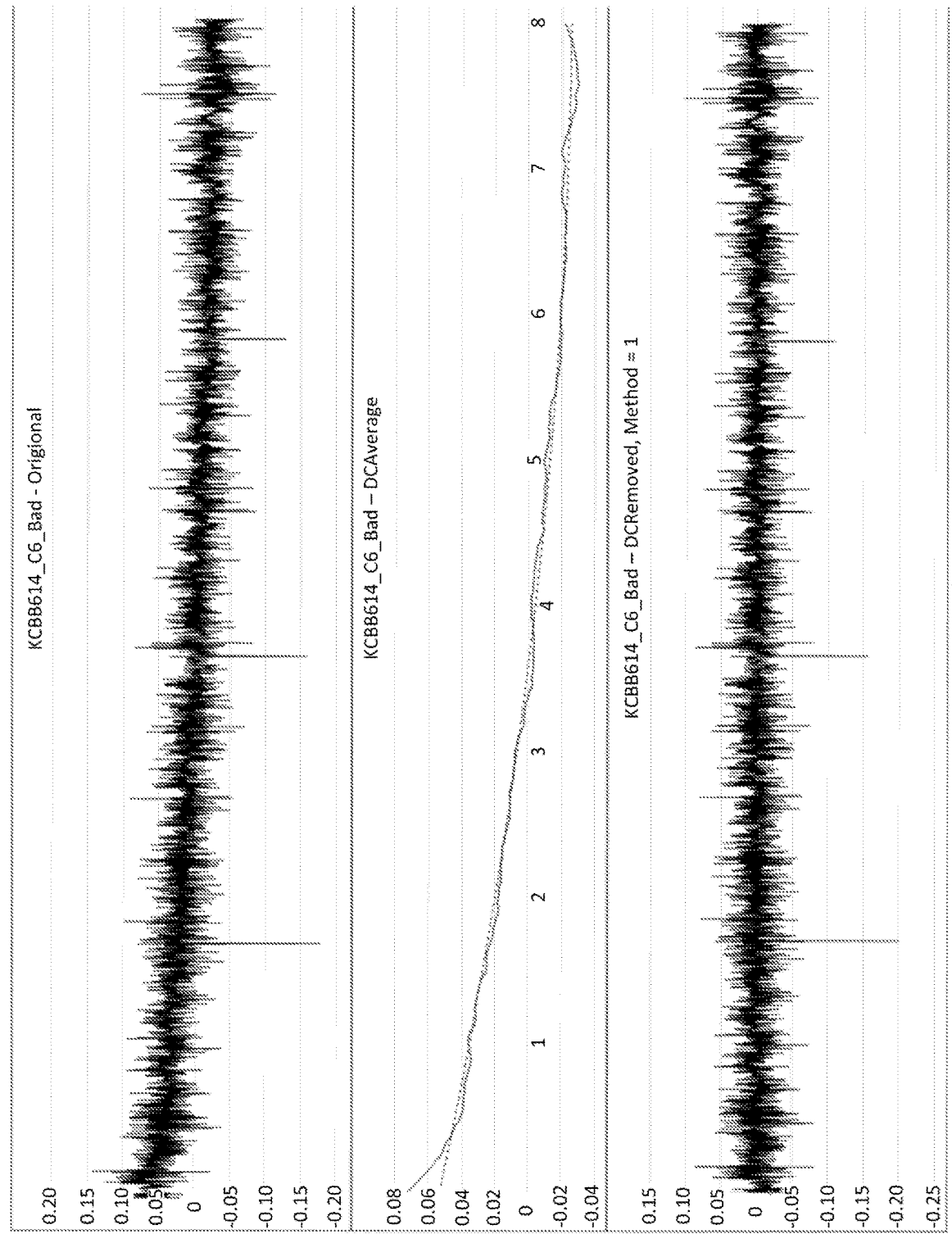
FIG. 10 depicts a typical vibration waveform that contains an asymptotically decaying DC bias component.

FIGS. 10 and 13 show a typical vibration waveform that contains an asymptotically decaying DC bias component. This exemplary data was collected using an Emerson AMS 9530 wireless vibration monitor. In each of these figures, the top plot shows the raw vibration waveform containing the asymptotically decaying DC bias component. The middle plot shows the asymptotically decaying DC bias component of the waveform, in which the solid line represents the first method and the dotted line represents the second method. The bottom plot shows the vibration waveform with the asymptotically decaying DC bias component subtracted out, in this example using the first method. The result using the second method in these examples is not shown but is similar.

Figure 11:
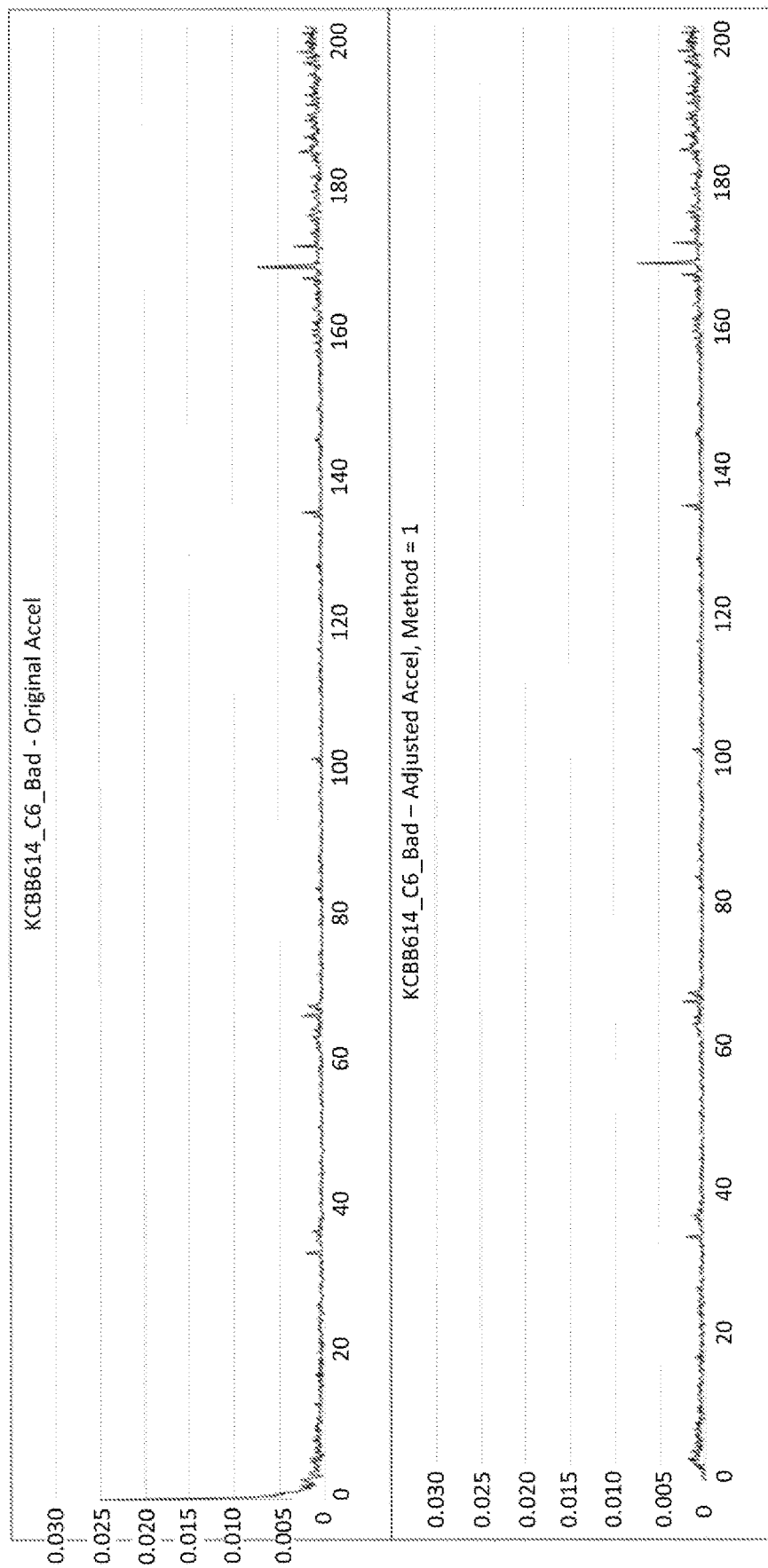
FIG. 11 depicts a vibration spectrum derived from the vibration waveform of FIG. 10 when a first method is used for removing the asymptotically decaying DC bias component of the vibration waveform data.
Figure 12:
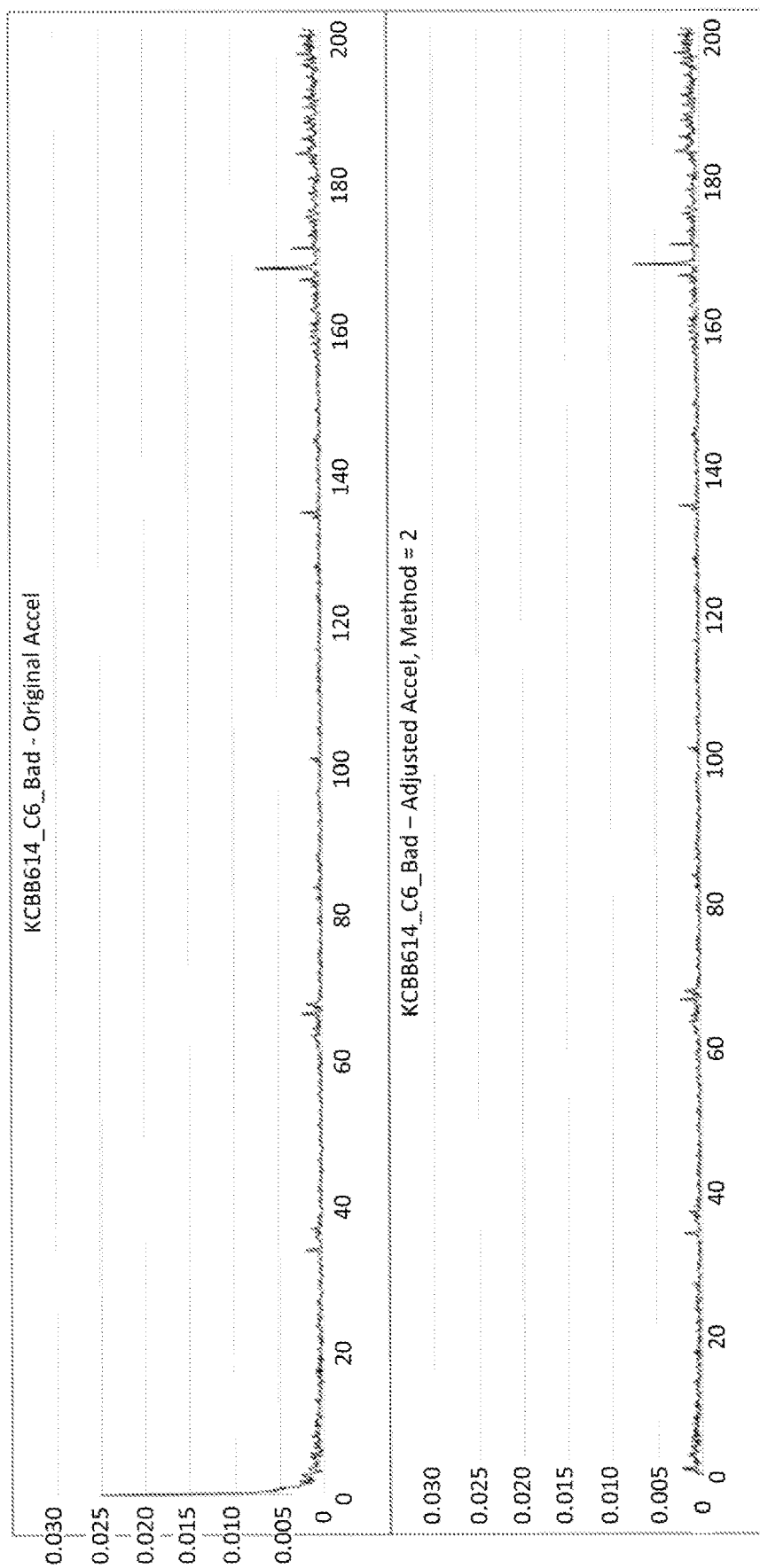
FIG. 12 depicts a vibration spectrum derived from the vibration waveform of FIG. 10 when a second method is used for removing the an asymptotically decaying DC bias component of the vibration waveform data.

FIGS. 11 and 14 show the resulting spectrum derived from the vibration waveforms when the first method is applied, and FIGS. 12 and 15 when the second method is applied. The top spectra in each of these figures, which were derived using the original waveform that contained the asymptotically decaying DC bias component, include the large low frequency components. The bottom spectra in each of these figures, derived from the waveform from which the asymptotically decaying DC bias component was removed, clearly show that the low frequency components related to the asymptotically decaying DC bias component have been eliminated.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A computer implemented method for processing time waveform machine vibration data that are indicative of operational characteristics of a machine, comprising:

(a) accessing the time waveform machine vibration data from a memory or storage device, wherein the time waveform machine vibration data were measured on the machine over a period of time having a begin time and an end time;

(b) determining an integer number M of waveform samples from the time waveform machine vibration data to be averaged;

(c) deriving an asymptotically decaying DC bias component in the time waveform machine vibration data using a moving average of the M number of waveform samples;

(d) extrapolating the asymptotically decaying DC bias component from the begin time of the waveform back to an earlier time and from the end time of the waveform forward to a later time;

(e) subtracting the asymptotically decaying DC bias component from the time waveform machine vibration data;

(f) performing a Fast Fourier Transform on the time waveform machine vibration data to generate a vibration spectrum that is devoid of spurious low frequency components that would otherwise be present in the vibration spectrum if the asymptotically decaying DC bias component had not been subtracted from the time waveform machine vibration data, which spurious low frequency components would be subject to misinterpretation by a technician as problems with the machine; and (g) displaying the vibration spectrum that is devoid of spurious low frequency components on a screen of a user interface device for viewing by the technician.

2. The computer implemented method of claim 1 wherein step (b) comprises determining the integer number M of waveform samples to be averaged based at least in part on a turning speed of a component of the machine.

3. The computer implemented method of claim 2 in which the integer number M of waveform samples includes samples collected over at least two full rotations of the component of the machine.

4. The computer implemented method of claim 1 wherein step (c) comprises deriving the asymptotically decaying DC bias component using a moving average beginning at least M/2 number of data values prior to the begin time and ending at least M/2 number of data values after the end time.

5. The computer implemented method of claim 1 wherein step (d) comprises extrapolating the asymptotically decaying DC bias component using a linear least square fit algorithm.

6. The computer implemented method of claim 1 wherein step (d) comprises extrapolating the asymptotically decaying DC bias component using 2M number of data values prior to the begin time of the derived asymptotically decaying DC bias component and using 2M number of data values after the end time of the derived asymptotically decaying DC bias component.

7. The computer implemented method of claim 1 wherein at least steps (a)-(e) are performed in real-time by a processor of a portable vibration analyzer or by software of a continuous online vibration monitoring system, such that the asymptotically decaying DC bias component is removed as the time waveform machine vibration data are being collected.

8. A computer implemented method for processing time waveform machine vibration data that are indicative of operational characteristics of a machine, comprising:

(a) accessing the time waveform machine vibration data from a memory or storage device, wherein the time waveform machine vibration data were measured on the machine over a period of time having a begin time and an end time;

(b) fitting a polynomial or exponential equation to the time waveform machine vibration data;

(c) calculating an asymptotically decaying DC bias component in the time waveform machine vibration data using the polynomial or exponential equation fitted in step (b);

(d) subtracting the asymptotically decaying DC bias component from the time waveform machine vibration data;

(e) performing a Fast Fourier Transform on the time waveform machine vibration data to generate a vibration spectrum that is devoid of spurious low frequency components that would otherwise be present in the vibration spectrum if the asymptotically decaying DC bias component had not been subtracted from the time waveform machine vibration data, which spurious low frequency components would be subject to misinterpretation by a technician as problems with the machine; and (f) displaying the vibration spectrum that is devoid of spurious low frequency components on a screen of a user interface device for viewing by the technician.

9. The computer implemented method of claim 8 wherein step (b) comprises fitting a quadratic equation to the time waveform machine vibration data.

10. The computer implemented method of claim 8 wherein at least steps (a)-(d) are performed in real-time by a processor of a portable vibration analyzer or by software of a continuous online vibration monitoring system, such that the asymptotically decaying DC bias component is removed as the time waveform machine vibration data are being collected.

11. A computer implemented process for operating on time waveform machine vibration data that are indicative of operational characteristics of a machine, comprising:

accessing the time waveform machine vibration data from a memory or storage device, wherein the time waveform machine vibration data were measured on a machine over a period of time having a begin time and an end time;

selecting either a first method or a second method for determining an asymptotically decaying DC bias component in the time waveform vibration data, wherein the first method comprises:

(a) determining an integer number M of waveform samples to be averaged;

(b) deriving the asymptotically decaying DC bias component in the time waveform machine vibration data using a moving average of the M number of waveform samples; and (c) extrapolating the asymptotically decaying DC bias component from the begin time of the waveform back to an earlier time and from the end time of the waveform forward to a later time, and wherein the second method comprises:

(d) fitting a polynomial or exponential equation to the time waveform machine vibration data; and (e) calculating the asymptotically decaying DC bias component using the polynomial or exponential equation fitted in step (d), performing either the first method or the second method to determine the asymptotically decaying DC bias component;

subtracting the asymptotically decaying DC bias component from the time waveform machine vibration data; and performing a Fast Fourier Transform on the time waveform machine vibration data to generate a vibration spectrum that is devoid of spurious low frequency components that would otherwise be present in the vibration spectrum if the asymptotically decaying DC bias component had not been subtracted from the time waveform machine vibration data, which spurious low frequency components would be subject to misinterpretation by a technician as problems with the machine; and displaying the vibration spectrum that is devoid of spurious low frequency components on a screen of a user interface device for viewing by the technician.

12. The computer implemented process of claim 11 wherein step (a) comprises determining the integer number M of waveform samples to be averaged based at least in part on a turning speed of a component of the machine.

13. The computer implemented process of claim 12 in which the integer number M of waveform samples includes samples collected over at least two full rotations of the component of the machine.

14. The computer implemented process of claim 11 wherein step (b) comprises deriving the asymptotically decaying DC bias component using a moving average beginning at least M/2 number of data values prior to the begin time and ending at least M/2 number of data values after the end time.

15. The computer implemented process of claim 11 wherein step (c) comprises extrapolating the asymptotically decaying DC bias component using a linear least square fit algorithm.

16. The computer implemented process of claim 11 wherein step (c) comprises extrapolating the asymptotically decaying DC bias component using 2M number of data values prior to the begin time of the derived asymptotically decaying DC bias component and using 2M number of data values after the end time of the derived asymptotically decaying DC bias component.

17. The computer implemented process of claim 11 wherein step (d) comprises fitting a quadratic equation to the time waveform machine vibration data.

18. The computer implemented process of claim 11 wherein the subtraction of the asymptotically decaying DC bias component from the time waveform machine vibration data is performed in real-time by a processor of a portable vibration analyzer or by software of a continuous online vibration monitoring system as the time waveform machine vibration data are being collected.

* * * * *